(12) United States Patent
Kotaka et al.

(10) Patent No.: US 10,050,279 B2
(45) Date of Patent: Aug. 14, 2018

(54) FUEL CELL

(71) Applicant: Nissan Motor Co., Ltd., Kangawa (JP)

(72) Inventors: Toshikazu Kotaka, Kanagawa (JP); Motoki Yaginuma, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 791 days.

(21) Appl. No.: 14/365,863

(22) PCT Filed: Jan. 21, 2013

(86) PCT No.: PCT/JP2013/051086
§ 371 (c)(1),
(2) Date: Jun. 16, 2014

(87) PCT Pub. No.: WO2013/111704
PCT Pub. Date: Aug. 1, 2013

(65) Prior Publication Data
US 2014/0335436 A1    Nov. 13, 2014

(30) Foreign Application Priority Data

Jan. 27, 2012   (JP) ................. 2012-015139

(51) Int. Cl.
| | |
|---|---|
| H01M 4/86 | (2006.01) |
| H01M 8/10 | (2016.01) |
| H01M 8/0273 | (2016.01) |
| H01M 8/1004 | (2016.01) |
| H01M 8/0245 | (2016.01) |

(Continued)

(52) U.S. Cl.
CPC ....... *H01M 4/8657* (2013.01); *H01M 4/8605* (2013.01); *H01M 4/8636* (2013.01); *H01M 8/0245* (2013.01); *H01M 8/0273* (2013.01); *H01M 8/1004* (2013.01);
(Continued)

(58) Field of Classification Search
None
See application file for complete search history.

(56) References Cited

FOREIGN PATENT DOCUMENTS

| | | |
|---|---|---|
| JP | 2006-210027 A | 8/2006 |
| JP | 2007-329083 A | 12/2007 |

(Continued)

OTHER PUBLICATIONS

International Search Report for corresponding International Application No. PCT/JP2013/051086, dated Feb. 19, 2013 (2 pages).

*Primary Examiner* — Barbara Lee Gilliam
*Assistant Examiner* — Adam A Arciero
(74) *Attorney, Agent, or Firm* — Osha Liang LLP

(57) ABSTRACT

A fuel cell has a membrane electrode assembly including an electrolyte membrane, catalyst layers disposed on both sides of the electrolyte membrane, and three or more layers of porous bodies disposed on a front surface side of the catalyst layer, a frame body surrounding an outer periphery of the electrolyte membrane, and a separator that partitions and forms a gas passage between the membrane electrode assembly and the separator. Extended portions are provided at an outer edge of a first porous body adjacent to the separator among the three layers of the porous bodies, and at an outer edge of a second porous body adjacent to the first porous body, respectively, so as to extend to be superimposed over the frame body. The extended portions of the first and second porous bodies intervene between the frame body and the separator.

20 Claims, 3 Drawing Sheets

(51) Int. Cl.
  *H01M 8/0232* (2016.01)
  *H01M 8/0234* (2016.01)
  *H01M 8/1018* (2016.01)

(52) U.S. Cl.
  CPC ........ *H01M 8/0232* (2013.01); *H01M 8/0234* (2013.01); *H01M 2008/1095* (2013.01)

(56) References Cited

FOREIGN PATENT DOCUMENTS

| | | |
|---|---|---|
| JP | 2008-523574 A | 7/2008 |
| JP | 2009-176610 A | 8/2009 |
| JP | 2009-289620 A | 12/2009 |
| WO | 2006/065365 A2 | 6/2006 |
| WO | 2008/126350 A1 | 10/2008 |

FUEL CELL

TECHNICAL FIELD

The present invention relates to improvement of fuel cells, such as a polymer electrolyte fuel cell (PEFC).

BACKGROUND ART

As one of these types of fuel cells, a membrane electrode assembly is disclosed in Patent Document 1. The membrane electrode assembly of Patent Document 1 includes a membrane-membrane reinforcing member assembly, an anode catalyst layer (first catalyst layer), a cathode catalyst layer (second catalyst layer), an anode gas diffusion layer (first gas diffusion layer), and a cathode gas diffusion layer (second gas diffusion layer).

The membrane-membrane reinforcing member assembly includes a polymer electrolyte membrane, one or more flaky first membrane reinforcing member disposed on a main surface of the polymer electrolyte membrane so as to extend along the periphery of the polymer electrolyte membrane as a whole, and one or more flaky second membrane reinforcing member disposed on the first membrane reinforcing member so as to extend along the periphery of the polymer electrolyte membrane as a whole such that the inner periphery of the second membrane reinforcing member does not conform to the inner periphery of the first membrane reinforcing member as viewed in the thickness direction of the polymer electrolyte membrane. Both the first and second membrane reinforcing members are mainly formed of synthetic resin.

The anode catalyst layer is formed to cover the main surface of the polymer electrolyte membrane so as to fill in an opening formed in the first membrane reinforcing member. Likewise, the cathode catalyst layer is formed to cover the main surface of the polymer electrolyte membrane. The anode gas diffusion layer is disposed to cover parts of the main surfaces of the anode catalyst layer and first membrane reinforcing member. The cathode gas diffusion layer is disposed to cover parts of the main surfaces of the cathode catalyst layer and first membrane reinforcing member.

The membrane-membrane reinforcing assembly with the configuration described above is intended to prevent breakage of the polymer electrolyte membrane due to the contact with an end of the gas diffusion layer, and to surely suppress the damage to the polymer electrolyte membrane caused by the end of the first membrane reinforcing member, thereby improving the durability of the assembly.

CITATION LIST

PATENT DOCUMENT

[Patent Document 1] WO2008/126350

SUMMARY OF INVENTION

Technical Problem

In order to miniaturize the fuel cell, in recent years, the use of porous metal material has been studied as the material for the gas diffusion layer instead of carbon material. When the gas diffusion layer is formed using the porous metal material, and arranged to cover the first membrane reinforcing member as disclosed in Patent Document 1, an excessive surface pressure is applied to a part wherein the gas diffusion layer is superimposed over the first membrane reinforcing member (periphery of the polymer electrolyte membrane), making it difficult to optimize the surface pressure of the polymer electrolyte membrane with the catalyst layer formed thereon, which is a problem to be solved.

The present invention has been made in view of the foregoing problems in the related art, and it is an object of the present invention to provide a fuel cell that can optimize the surface pressure applied to a power generation region of a membrane electrode structure including a polymer electrolyte membrane by preventing the application of an excessive pressure on the periphery of the polymer electrolyte membrane.

Solution to Problem

A fuel cell according to the present invention includes: a membrane electrode assembly having an electrolyte membrane, catalyst layers disposed on both sides of the electrolyte membrane, and three or more layers of porous bodies on a front side of the catalyst layer; a frame body surrounding an outer periphery of the electrolyte membrane; and a separator for partitioning and forming a gas passage between the membrane electrode assembly and the separator. The fuel cell also includes extended portions extending from an outer edge of a first porous body adjacent to the separator among the three layers of the porous bodies, and from an outer edge of a second porous body adjacent to the first porous body, respectively, so as to be superimposed over the frame body. The extended portions of the first and second porous bodies intervene between the frame body and the separator. The above configuration acts as the means for solving the problems in the related art.

In the fuel cell, the extended portion of the second porous body among the extended portions of the first and second porous bodies intervening in between the frame body and the separator can receive the surface pressure acting between the extended portion of the first porous body and the frame body, thereby optimizing the surface pressure acting on the power generation region (region where the catalyst layer is formed) of the membrane electrode assembly.

Advantageous Effect of Invention

The present invention can prevent an excessive pressure from being applied between the extended portion of the first porous body and the frame body, thereby optimizing the surface pressure applied to the power generation region of the membrane electrode assembly (the region where the catalyst layer is formed).

DESCRIPTION OF EMBODIMENTS

Figure 1:
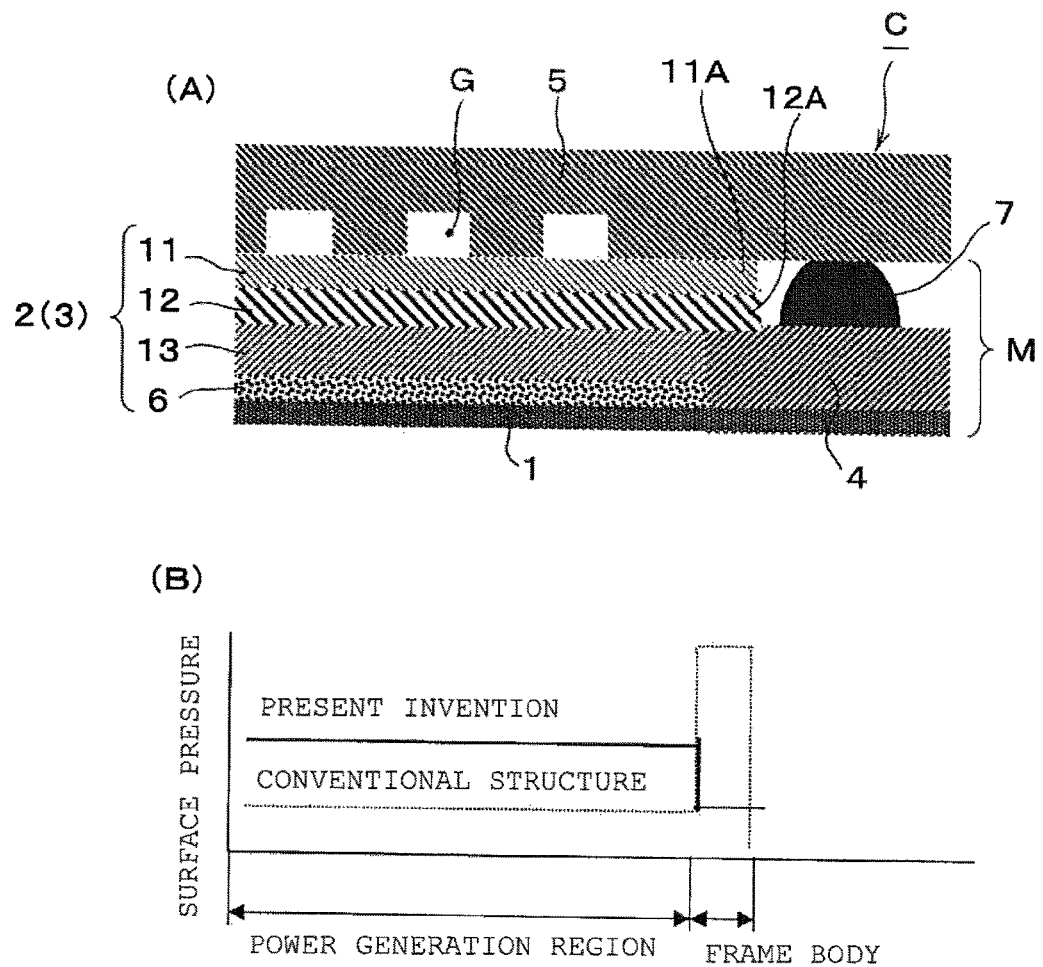
FIG. 1A is a cross-sectional view for explaining a fuel cell according to one embodiment of the present invention with one side of the fuel cell omitted.
FIG. 1B is a graph for comparing the surface pressure of the fuel cell in the present invention with the surface pressure of a conventional fuel cell structure.

In the following, a fuel cell according to one embodiment of the present invention will be described based on the accompanying drawings.

A fuel cell C shown in FIGS. 1A and 2A includes a membrane electrode assembly M having an electrolyte membrane (polymer electrolyte membrane) 1, and a cathode layer 2 and an anode layer 3 as an electrode layer disposed on both sides of an electrolyte membrane 1, a frame body 4 surrounding the outer periphery of the electrolyte membrane 1, and separators 5 and 5 for partitioning and forming respective gas passages G and G partitioned from the membrane electrolyte assembly M. FIG. 1A shows only the cathode layer 2. However, on the opposite side (lower side of the figure) of the electrolyte membrane 1, the anode layer (3) is formed.

The membrane electrode assembly M is the so-called MEA (Membrane Electrode Assembly). In this embodiment, the membrane electrode assembly M includes a gas diffusion layer. That is, each of the cathode layer 2 and anode layer 3 of the membrane electrode assembly M includes a catalyst layer 6 adjacent to the electrolyte membrane 1, as well as three or more layered porous body disposed on the front surface side of the catalyst layer and serving as the gas diffusion layer. The details of the porous body will be described later.

The frame body 4 is a member formed of resin and serving as a frame or gasket. As shown in FIG. 2B, the frame body 4 has a rectangular planar shape with a predetermined thickness larger than that of the electrolyte membrane 1, and is integrally formed with the electrolyte membrane 1 with the membrane 1 exposed from a center of the frame body.

Figure 2:
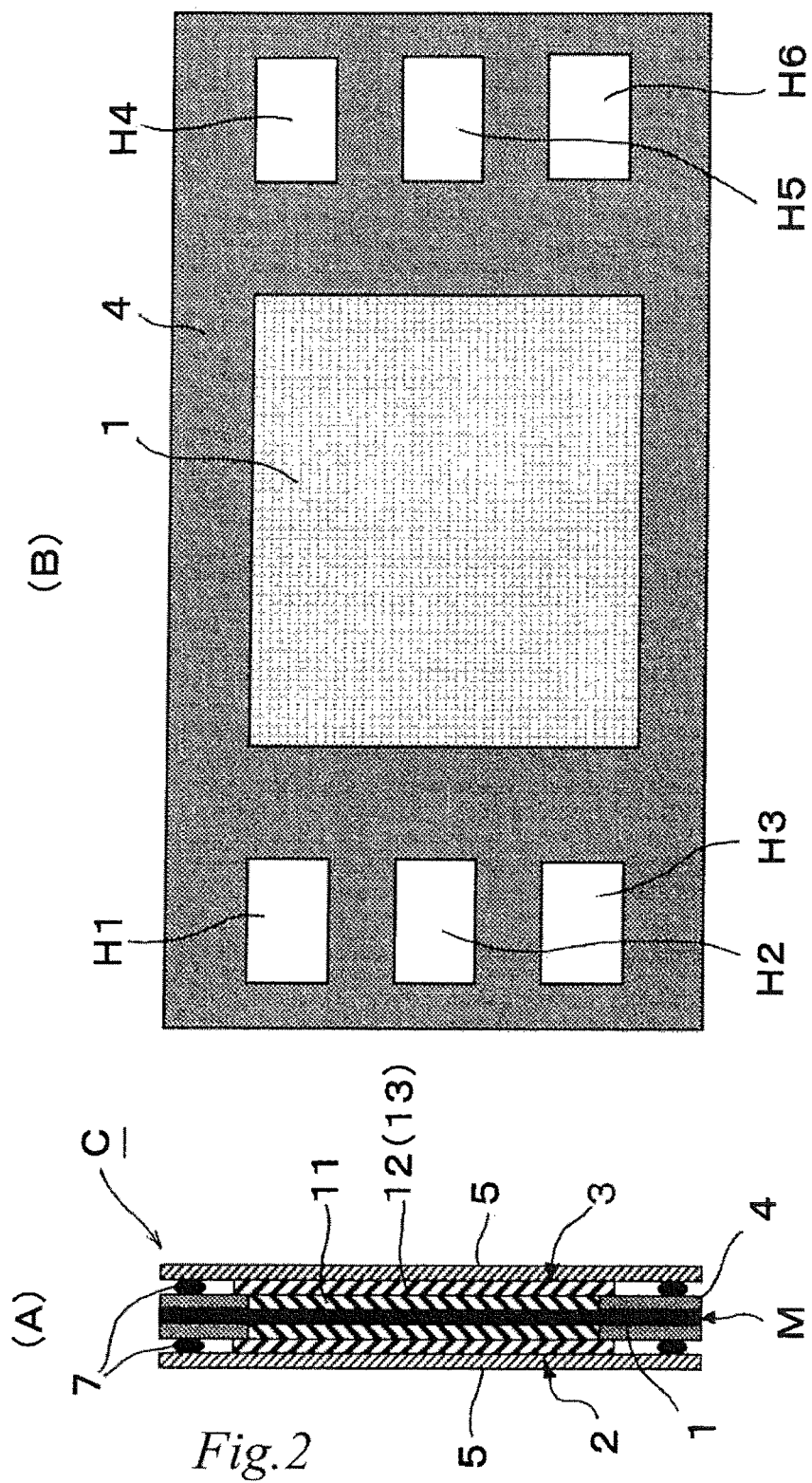
FIG. 2A is a cross-sectional view of the entire fuel cell shown in FIG. 1.
FIG. 2B is a plan view of a frame body and an electrolyte membrane included in the fuel cell.

The frame body 4 has supply holes H1 to H3 for cathode gas (oxygen-containing gas), coolant, and anode gas (hydrogen-containing gas) on one short side thereof, that is, on the left side shown in FIG. 2, and discharge holes H4 to H6 for these fluids on the other short side thereof. The positional relationship between the supply and discharge holes can be appropriately changed.

The separator 5 also serves as a current collector, has a rectangular planar shape corresponding to the frame body 4, and is provided with supply holes and discharge holes (not shown) similar to those formed in the frame body 4. Each separator 5 is adapted to form the gas passages G described above by being superimposed on the membrane electrode assembly M. In stacking a plurality of pieces of the fuel cells C of this embodiment, the respective supply holes (H1 to H3) and the discharge holes (H4 to H6) are continuously stacked on each other in the stacking direction to form flow passages, through which coolant flows between the fuel cells C adjacent thereto (between the separators 5).

A seal member 7, whose part is shown in FIG. 1, intervenes between the above-mentioned separator 5 and the membrane electrode assembly M. The seal members 7 are disposed at the outer periphery of the frame body 4, and around the supply holes H1 to H3 and discharge holes H4 to H6. Opening parts are provided in the surroundings of the respective holes H1 to H6 not to interrupt the flow of gas to the corresponding layer.

The above fuel cell C includes at least three layers of porous bodies 11, 12, and 13 on the front surface side of the electrode layer (the cathode layer 2 and the anode layer 3) as mentioned above. The first porous body 11 adjacent to the separator 5 and the second porous body 12 adjacent to the first porous body, among the porous bodies 11, 12, and 13 forming three layers, have extended portions 11A and 12A extending from the outer edges of the respective bodies so as to be superimposed on the inner edge of the frame body 4. In the fuel cell C, the extended portions 11A and 12A of the first and second porous bodies 11 and 12 intervene between the frame body 4 and the separator 5.

The extended portion 11A of the first porous body 11 extends to be superimposed on the inner edge of the frame body 4, which prevents the end of the first porous body 11 from being brought into contact with the electrolyte membrane 1 to break the electrolyte membrane 1. The extended portion 11A of the first porous body can suppress the difference in pressure between the cathode and the anode, or the fluctuations in the frame body 4 due to swelling and contraction of the electrolyte membrane 1, which relaxes the concentration of stress onto the electrolyte membrane 1 at a boundary surface between the catalyst layer 6 and the frame body 4.

In this embodiment, the second porous body 12 has the extended portion 12A having the same thickness as that of a main body of the porous body 12. Alternatively, when the second porous body 12 may be formed of a laminate of a plurality of layers, only one of which may be provided with the extended portion 12A.

In the above fuel cell C, a compressive elastic modulus of the first porous body 11 is set larger than that of each of other porous bodies 12 and 13.

In a preferred embodiment, the first porous body 11 can be formed using one or more kinds of metals selected from iron, stainless steel, aluminum, an aluminum alloy, titanium, a titanium alloy, chromium, a chromium alloy, nickel, a nickel alloy, magnesium, and a magnesium alloy. The first porous body 11 is formed of a wire fabric, a punching metal, an etching metal, an expanding metal, or the like.

In the fuel cell C of a preferred embodiment, the second porous body 12 and the third porous body 13 adjacent thereto are formed of carbon material, and in a more preferred embodiment, can be formed using a sheet-like carbon material. The second porous body 12 and the third porous body 13 are formed integrally with each other using the same material.

A plurality of pieces of the fuel cells with the configuration described above is stacked on each other with end plates placed on both sides of the fuel cells. Both end plates are coupled together by applying a predetermined load on the fuel cells in the stacking direction to produce a fuel cell stack. In this state, each fuel cell C receives a predetermined surface pressure.

At this time, in the fuel cell C, the second porous body 12, specifically, the second porous body 12 with the extended portion 12A directly contacting the frame body 14 serves as an elastic member to receive the surface pressure acting between the extended portion 11A of the first porous body 11 and the frame body 4.

More specifically, as shown in FIG. 1B, in a conventional structure without the second porous body 12 including the extended portion 12A, the surface pressure between the extended portion 11A of the first porous body 11 and the frame body 4 becomes high. That is, an unbalanced surface pressure is caused. In contrast, in the fuel cell C of the present invention, the second porous body 12 with the extended portion 12A absorbs the unbalanced surface pressure between the extended portion 11A of the first porous body 11 and the frame body 4, so that the surface pressure at the power generation region of the membrane electrode assembly M is obviously optimized to a higher level than that in the conventional structure.

Thus, the fuel cell C can prevent the excessive surface pressure from being applied to between the extended portion 11A of the first porous body 11 and the frame body 4, thereby optimizing the surface pressure applied to the power generation region (region where the catalyst layer 6 is formed) of the membrane electrode assembly M. Accordingly, in the fuel cell stack including a laminate of the above fuel cells C, the appropriate surface pressure is applied to the power generation region of each fuel cell C to efficiently perform the power generation, thereby enhancing the power generation performance as a whole.

The above fuel cell C sets a compressive elastic modulus of the first porous body 11 larger than that of the other porous bodies 12 and 13. In this way, the first porous body 11 is formed of a rigid member as compared to the other members, which can further enhance the elastic functions of the surface pressure absorption and fluctuation absorption by means of the second porous body 12.

The above fuel cell C uses the metal described above as the material for the first porous body 11, thereby allowing the second porous body 12 to effectively absorb the surface pressure and the fluctuations.

Further, the above fuel cell C can use carbon material as the material for the second and third porous bodies 12 and 13 to further increase the elastic functions of the absorption of the surface pressure and fluctuation by means of the second porous body 12. In particular, the sheet-like carbon is used as the above carbon material, which can facilitate the manufacture of the fuel cell in addition to the improvement of the elastic function of the second porous body 12.

An elastic modulus of the second porous body 12 may be smaller than that of the third porous body 13. The second porous body 12 is made softer than the third porous body 13, which can further enhance the surface pressure absorption function of the second porous body 12 with the extended portion 12A, thereby optimizing the surface pressure applied to the power generation region of the membrane electrode assembly M, while preventing the unbalanced surface pressure between the extended portion 11A of the first porous body 11 and the frame body 4.

Figure 3:
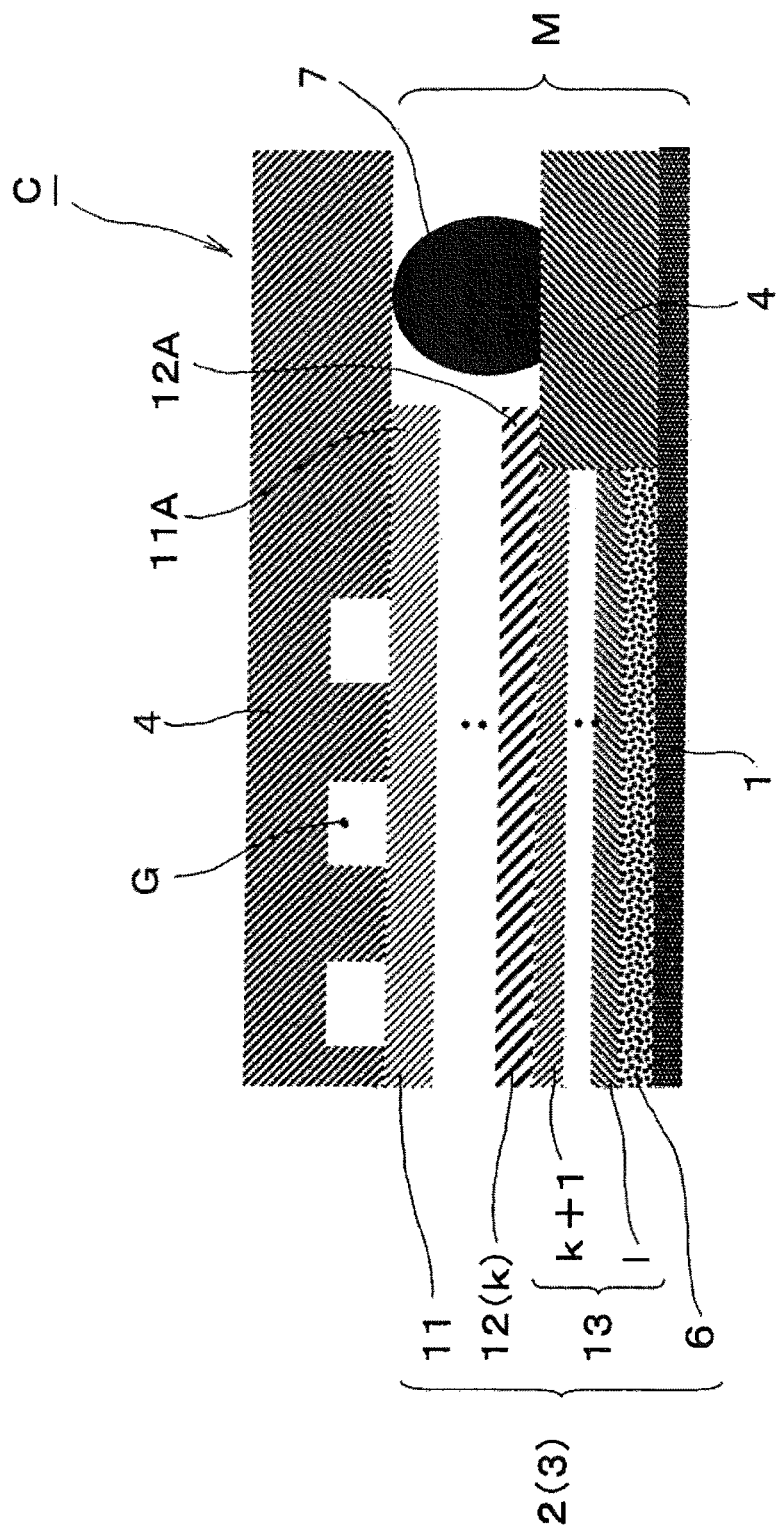
FIG. 3 is a cross-sectional view of a fuel cell according to another embodiment of the present invention with one side of the fuel cell omitted.

FIG. 3 is an explanatory diagram of a fuel cell according to another embodiment of the present invention. The same components of this embodiment as those of the previous embodiments are designated by the same reference characters, and thus the description thereof will be omitted.

In the fuel cell C of this embodiment shown in the figure, each of the second and third porous bodies 12 and 13 is illustrated in the form of a plurality of layers for easy explanation of various parameters. That is to say, in the fuel cell C, among the porous bodies 11 to 13, respective porous bodies k constitute the second porous body 12, while respective porous bodies k+1 to 1 (k≥2) constitute the third porous body 13 which does not have the extended portions 11A and 12A.

Referring to FIG. 3, there are some clearances between the first and second porous bodies 11 and 12, and in the third porous body 13. The clearances in respective positions are designated by two dots arranged longitudinally, which implies that a plurality of layers are included.

In the fuel cell C, when Ei (i=k+1 to 1) is an elastic modulus of each porous body included in the third porous body 13, ti (i=k+1 to 1) is a thickness of each porous body included in the third porous body 13, and P is a surface pressure, a thickness tg of the frame body is set to satisfy the following formula.

$$t_g = \sum_{i=k+1}^{l} \left(1 - \frac{P}{E_i}\right) t_i \quad \text{[Formula 1]}$$

The fuel cell C is designed to have a thickness and an elastic modulus of the porous body without the extended portions 11A and 12A among the respective porous bodies 11 to 13, that is, each porous body included in the third porous body 13 in the example shown in the figure, as well as a thickness of the frame body 4 based on the above-mentioned formula. Thus, the fuel cell C can optimize the surface pressure applied to the power generation region of the membrane electrode assembly M while preventing the excessive surface pressure from being applied to between the expanded portion 11A of the first porous body 11 and the frame body 4.

When the respective porous bodies 2 to k (k≥2) constitute the second porous body 12 in the fuel cell C, the relationship between the elastic coefficient Eh of each porous body included in the second porous body 12 (h=2 to k) and the elastic coefficient Ei of each porous body included in the third porous body 13 (i=k+1 to 1) is set as follows: Ei≥Eh.

In the above fuel cell C, the second porous body 12 is softer than the third porous bodies 13, which can further enhance the absorption function of the surface pressure by the second porous body 12 with the extended portion 12A, while preventing the unbalanced surface pressure between the extended portion 11A of the first porous body 11 and the frame body 4. Thus, the fuel cell C can optimize the surface pressure applied to the power generation region of the membrane electrode assembly M.

Further, in the above fuel cell C, the relationship between an electron conductivity σh of each of the respective porous bodies included in the second porous body 12 and an electron conductivity σi of the respective porous bodies included in the first porous body 13 is set as follows: σi≥σh.

In the above fuel cell C, each of the respective porous bodies included in the third porous body 13 has a large electron conductivity σi (generally, has a high elastic modulus), whereas each of the respective porous bodies included in the second porous body 12 has a small electron conductivity σh (generally, has a low elastic modulus). Thus, the fuel cell C can decrease the resistance while ensuring the function of optimizing the surface pressure, thereby achieving the improvement of the cell performance.

The fuel cell configuration of the present invention is not limited to that of each of the embodiments described above. The configuration described in one embodiment can be applied or used in another embodiment, and the details of the configuration can be changed as appropriate.

REFERENCE SIGNS LIST

C FUEL CELL
G GAS PASSAGE
M MEMBRANE ELECTRODE ASSEMBLY
1 electrolyte membrane
2 cathode layer (electrode layer)
3 anode layer (electrode layer)
4 frame body
5 separator
11 first porous body
11A extended portion
12 second porous body
12A extended portion
13 third porous body

The invention claimed is:
1. A fuel cell, comprising:
a membrane electrode assembly including an electrolyte membrane, catalyst layers disposed on both sides of the electrolyte membrane, and three or more layers of porous bodies disposed on a front surface side of each of the catalyst layers;
a frame body surrounding an outer periphery of the electrolyte membrane;
a separator that partitions and forms a gas passage between the membrane electrode assembly and the separator; and
a seal member intervened between the membrane electrode assembly and the separator,
wherein the three or more layers of the porous bodies include a first porous body adjacent to the separator, a second porous body adjacent to the first porous body, and a third porous body adjacent to the second porous body,
wherein extended portions are provided at an outer edge of the first porous body and at an outer edge of the second porous body,
wherein the extended portions of the first and second porous bodies are superimposed over the frame body at a position beyond an outer periphery of the third porous body,
wherein the extended portions are disposed on an inner side of the seal member, and
wherein the extended portions intervene between the frame body and the separator.

2. The fuel cell according to claim 1, wherein a compressive elastic modulus of the first porous body is larger than that of the other porous bodies.

3. The fuel cell according to claim 1, wherein the first porous body is formed of one or more metals selected from iron, stainless steel, aluminum, an aluminum alloy, titanium, a titanium alloy, chromium, a chromium alloy, a nickel, a nickel alloy, a magnesium, and a magnesium alloy.

4. The fuel cell according to claim 1, wherein the second porous body and the third porous body are formed of carbon material.

5. The fuel cell according to claim 4, wherein the carbon material is a sheet-shaped carbon material.

6. The fuel cell according to claim 1,
wherein the third porous body includes a plurality of layers, and
wherein a thickness of the frame body (tg) satisfies the following formula when k+1 to 1(k≥2) indicate the layers included in the third porous body, Ei (i=k+1 to 1) is an elastic modulus of each of the layers included in the third porous body, ti (i=k+1 to 1) is a thickness of each of the layers included in the third porous body, and P is a surface pressure $$t_g = \sum_{i=k+1}^{l} \left(1 - \frac{P}{E_i}\right) t_i \quad \text{[Formula 1]}$$

7. The fuel cell according to claim 6, wherein the second porous body includes a plurality of layers, and wherein a relationship between the elastic modulus Eh of each of the layers included in the second porous body, and the elastic modulus Ei of each of the layers included in the third porous body satisfies: Ei≥Eh.

8. The fuel cell according to claim 7, wherein a relationship between an electron conductivity σh of each of the layers included in the second porous body and an electron conductivity σi of each of the layers included in the third porous body satisfies: σi≥σh.

9. A fuel cell stack formed by stacking a plurality of the fuel cells according to claim 1.

10. The fuel cell according to claim 2, wherein the first porous body is formed of one or more metals selected from iron, stainless steel, aluminum, an aluminum alloy, titanium, a titanium alloy, chromium, a chromium alloy, a nickel, a nickel alloy, a magnesium, and a magnesium alloy.

11. The fuel cell according to claim 2, wherein the second porous body and the third porous body are formed of carbon material.

12. The fuel cell according to claim 3, wherein the second porous body and the third porous body are formed of carbon material.

13. The fuel cell according to claim 2, wherein the third porous body includes a plurality of layers, and wherein a thickness of the frame body (tg) satisfies the following formula when k+1 to 1 (k≥2) indicate the layers included in the third porous body, Ei (i=k+1 to 1) is an elastic modulus of each of the layers included in the third porous body, ti (i=k+1 to 1) is a thickness of each of the layers included in the third porous body, and P is a surface pressure.

$$t_g = \sum_{i=k+1}^{l} \left(1 - \frac{P}{E_i}\right) t_i \quad \text{[Formula 1]}$$

14. The fuel cell according to claim 3, wherein the third porous body includes a plurality of layers, and wherein a thickness of the frame body (tg) satisfies the following formula when k +1 to 1 (k≥2) indicate the layers included in the third porous body, Ei (i =k +1 to 1) is an elastic modulus of each of the layers included in the third porous body, ti (i=k +1 to 1) is a thickness of each of the layers body included in the third porous body, and P is a surface pressure $$t_g = \sum_{i=k+1}^{l} \left(1 - \frac{P}{E_i}\right) t_i \quad \text{[Formula 1]}$$

15. The fuel cell according to claim 4, wherein the third porous body includes a plurality of layers, and wherein a thickness of the frame body (tg) satisfies the following formula when k+1 to 1 (k≥2) indicate the layers included in the third porous body, Ei (i=k+1 to 1) is an elastic modulus of each of the layers included in the third porous body, ti (i=k+1 to 1) is a thickness of each of the layers included in the third porous body, and P is a surface pressure $$t_g = \sum_{i=k+1}^{l} \left(1 - \frac{P}{E_i}\right) t_i \quad \text{[Formula 1]}$$

16. The fuel cell according to claim 5, wherein the third porous body includes a plurality of layers, and wherein a thickness of the frame body (tg) satisfies the following formula when k+1 to 1 (k≥2) indicate the layers included in the third porous body, Ei (i=k+1 to 1) is an elastic modulus of each of the layers included in the third porous body, ti (i=k+1 to 1) is a thickness of each of the layers included in the third porous body, and P is a surface pressure $$t_g = \sum_{i=k+1}^{l} \left(1 - \frac{P}{E_i}\right) t_i \quad \text{[Formula 1]}$$

17. A fuel cell stack formed by stacking a plurality of the fuel cells according to claim 2.

18. A fuel cell stack formed by stacking a plurality of the fuel cells according to claim 3.

19. A fuel cell stack formed by stacking a plurality of the fuel cells according to claim 4.

20. A fuel cell stack formed by stacking a plurality of the fuel cells according to claim 5.

* * * * *